United States Patent [19]
Punch, III et al.

[11] Patent Number: 5,924,105
[45] Date of Patent: Jul. 13, 1999

[54] METHOD AND PRODUCT FOR DETERMINING SALIENT FEATURES FOR USE IN INFORMATION SEARCHING

[75] Inventors: William F. Punch, III, Williamston; Marilyn R. Wulfekuhler, Lansing; Erik D. Goodman, East Lansing, all of Mich.

[73] Assignee: Michigan State University, East Lansing, Mich.

[21] Appl. No.: 09/013,453

[22] Filed: Jan. 26, 1998

Related U.S. Application Data

[60] Provisional application No. 60/036,452, Jan. 27, 1997.
[51] Int. Cl.$^6$ ................................................. G06F 17/21
[52] U.S. Cl. .................... 707/513; 707/2; 707/3; 707/5; 707/534; 704/7; 704/9
[58] Field of Search .............................. 707/5, 3, 2, 513, 707/534; 704/9, 7

[56] References Cited

U.S. PATENT DOCUMENTS

| | | | |
|---|---|---|---|
| 4,774,655 | 9/1988 | Kollin et al. | 364/200 |
| 4,775,956 | 10/1988 | Kaji et al. | 364/900 |
| 5,168,565 | 12/1992 | Morita | 395/600 |
| 5,265,065 | 11/1993 | Turtle | 395/600 |
| 5,278,980 | 1/1994 | Pedersen et al. | 395/600 |
| 5,325,298 | 6/1994 | Gallant | 364/419.19 |
| 5,418,948 | 5/1995 | Turtle | 395/600 |
| 5,418,951 | 5/1995 | Damashek | 395/600 |
| 5,437,027 | 7/1995 | Bannon et al. | 395/600 |
| 5,487,132 | 1/1996 | Cheng | 395/63 |
| 5,506,984 | 4/1996 | Miller | 395/600 |
| 5,511,186 | 4/1996 | Carhart et al. | 395/600 |
| 5,519,859 | 5/1996 | Grace | 395/200 |
| 5,530,852 | 6/1996 | Meske, Jr. et al. | 395/600 |
| 5,600,831 | 2/1997 | Levy et al. | 707/2 |
| 5,625,554 | 4/1997 | Cutting et al. | 364/611 |
| 5,787,422 | 7/1998 | Tukey et al. | 707/5 |
| 5,794,178 | 8/1998 | Caid et al. | 704/9 |

OTHER PUBLICATIONS

Dattola, R., "First: Flexible Information Retrieval System For Text", J Am Soc Inf Sci, v 30, n 1, abstract only, Jan. 1979.
Summer, R. et al., "An investigation of relevance feedback using adaptive linear and probabilistic models", Fifth Text Retrieval Conference, abstract only, Nov. 1996.
Ellis, D. et al., "End–user searching of bibliographic databases: evaluation of an experimental best match retrieval system", Online Information Retrieval in Practice. Proceedings of the 2nd UK Online user Group State of the Art Conference, Abstract only, 1986.
IBM Corporation, Automatic Hypermedia Link Generation, IBM TDB, Jun., 1992, journal, Software Patent Institute Database of Software Technologies.
K. Obraczka, P.B. Danzig, S–H Li, University of Southern California, Internet Resource Discovery Services article, Sep. 1993, pp. 8–22.
N.J. Belkin, W.B. Croft, Communications of the ACM Journal, Information Filtering and Information Retrieval: Two Sides Of The Same Coin?, Dec. 1992.
D. Steinberg, PC–Computing Journal, Demon Knowbots (Intelligent Software Robots), Jan. 1990.
IBM Corporation, Automatic Recognition Of Universal Resource Locator and Launching of Web Browser, IBM TDB, Feb. 1996, pp. 1–2.

*Primary Examiner*—Paul V. Kulik
*Assistant Examiner*—Jean R. Homere
*Attorney, Agent, or Firm*—Brooks & Kushman, PC

[57] ABSTRACT

A method and product are provided for generating a word set for use in locating a document having a type similar to a type of document in a document collection. The method includes selecting multiple documents from the document collection, each document selected including multiple words, and stemming the words in each document selected to obtain multiple stem words. The method also includes determining a word count for each stem word in each document, and clustering the stem words based on the word count of each stem word in each document to obtain a word set. The product includes a storage medium having programmed instructions recorded thereon for performing the method steps.

23 Claims, 3 Drawing Sheets

| Category | Doc Num | action | affirm | descrimin | drug | fda | banana | central | cereal | chairman |
|---|---|---|---|---|---|---|---|---|---|---|
| legal | 25 | 7 | 0 | 0 | 0 | 0 | 0 | 0 | 0 | 0 |
|  | 27 | 7 | 0 | 0 | 42 | 33 | 0 | 0 | 0 | 0 |
|  | 28 | 53 | 0 | 0 | 2 | 5 | 1 | 0 | 5 | 0 |
|  | 29 | 3 | 0 | 0 | 0 | 47 | 0 | 0 | 0 | 0 |
|  | 30 | 1 | 0 | 0 | 0 | 27 | 0 | 1 | 0 | 0 |
| labor | 41 | 2 | 0 | 1 | 0 | 0 | 0 | 0 | 0 | 0 |
|  | 42 | 1 | 0 | 10 | 0 | 0 | 0 | 0 | 0 | 0 |
|  | 44 | 1 | 0 | 0 | 0 | 0 | 0 | 0 | 0 | 0 |
|  | 45 | 2 | 0 | 0 | 0 | 0 | 0 | 0 | 0 | 0 |
|  | 46 | 31 | 31 | 15 | 0 | 0 | 0 | 0 | 0 | 0 |
|  | 47 | 52 | 50 | 12 | 0 | 0 | 0 | 0 | 0 | 0 |
|  | 48 | 4 | 4 | 0 | 0 | 0 | 0 | 0 | 0 | 0 |
|  | 49 | 2 | 2 | 0 | 0 | 0 | 0 | 0 | 0 | 0 |
|  | 50 | 51 | 49 | 23 | 1 | 0 | 0 | 2 | 0 | 0 |
| government | 53 | 5 | 0 | 0 | 0 | 0 | 0 | 0 | 0 | 0 |
|  | 58 | 4 | 1 | 0 | 0 | 0 | 0 | 0 | 0 | 0 |
|  | 59 | 5 | 0 | 0 | 0 | 0 | 0 | 2 | 0 | 2 |
|  | 60 | 2 | 0 | 0 | 0 | 0 | 0 | 0 | 0 | 2 |
|  | 66 | 0 | 0 | 0 | 1 | 0 | 0 | 0 | 0 | 0 |
|  | 68 | 0 | 2 | 0 | 0 | 0 | 0 | 0 | 0 | 0 |
|  | 70 | 0 | 0 | 0 | 3 | 0 | 0 | 0 | 0 | 1 |
|  | 71 | 0 | 2 | 0 | 4 | 1 | 0 | 0 | 0 | 0 |
|  | 72 | 14 | 0 | 0 | 0 | 0 | 0 | 0 | 0 | 0 |
|  | 76 | 0 | 0 | 0 | 0 | 0 | 0 | 1 | 0 | 0 |

Fig. 1

| Category | Number of Documents |
|---|---|
| design | 23 |
| government | 15 |
| labor | 13 |
| legal | 34 |
| total | 85 |

Fig. 2

| Category | Doc Num | action | affirm | descrimin | drug | fda | banana | central | cereal | chairman |
|---|---|---|---|---|---|---|---|---|---|---|
| legal | 25 | 7 | 0 | 0 | 0 | 0 | 0 | 0 | 0 | 0 |
| | 27 | 7 | 0 | 0 | 42 | 33 | 0 | 0 | 0 | 0 |
| | 28 | 53 | 0 | 0 | 2 | 5 | 1 | 0 | 5 | 0 |
| | 29 | 3 | 0 | 0 | 0 | 47 | 0 | 0 | 0 | 0 |
| | 30 | 1 | 0 | 0 | 0 | 27 | 0 | 1 | 0 | 0 |
| labor | 41 | 2 | 0 | 1 | 0 | 0 | 0 | 0 | 0 | 0 |
| | 42 | 1 | 0 | 10 | 0 | 0 | 0 | 0 | 0 | 0 |
| | 44 | 1 | 0 | 0 | 0 | 0 | 0 | 0 | 0 | 0 |
| | 45 | 2 | 0 | 0 | 0 | 0 | 0 | 0 | 0 | 0 |
| | 46 | 31 | 31 | 15 | 0 | 0 | 0 | 0 | 0 | 0 |
| | 47 | 52 | 50 | 12 | 0 | 0 | 0 | 0 | 0 | 0 |
| | 48 | 4 | 4 | 0 | 0 | 0 | 0 | 0 | 0 | 0 |
| | 49 | 2 | 2 | 0 | 0 | 0 | 0 | 0 | 0 | 0 |
| | 50 | 51 | 49 | 23 | 1 | 0 | 0 | 0 | 0 | 0 |
| government | 53 | 5 | 0 | 0 | 0 | 0 | 0 | 0 | 0 | 0 |
| | 58 | 4 | 1 | 0 | 0 | 0 | 0 | 2 | 0 | 0 |
| | 59 | 5 | 0 | 0 | 0 | 0 | 0 | 0 | 0 | 2 |
| | 60 | 2 | 0 | 0 | 0 | 0 | 0 | 0 | 0 | 2 |
| | 66 | 0 | 0 | 0 | 1 | 0 | 0 | 0 | 0 | 0 |
| | 68 | 2 | 0 | 0 | 0 | 0 | 0 | 0 | 0 | 0 |
| | 70 | 0 | 0 | 0 | 3 | 0 | 0 | 0 | 0 | 1 |
| | 71 | 2 | 0 | 0 | 4 | 1 | 0 | 0 | 0 | 0 |
| | 72 | 14 | 0 | 0 | 0 | 0 | 0 | 0 | 0 | 0 |
| | 76 | 0 | 0 | 0 | 0 | 0 | 0 | 1 | 0 | 0 |

| Cluster 1 | Cluster 2 | Cluster 3 | Cluster 4 | Cluster 5 | Cluster 6 | Cluster 7 |
|---|---|---|---|---|---|---|
| employee fmla leav | applic claim file invent patent provision | action affirm american discrimin job minor opportun peopl women | cadmaz consult copyright custom design manag project sect servic | cfr contain cosmet ey hair ingredi label manufactur product regul | amend bankruptci code court creditor debtor petition properti section secur truste | anim commod cpg except fat fe food fruit level ppm refer top veget |

Fig. 3

| Cluster 1 | Cluster 2 | Cluster 3 | | Cluster 4 | |
|---|---|---|---|---|---|
| iso | patent | busi export govern onlin resourc | commerci financ help program | corpor engin inform office servic utsi | design home intern page system |
| Cluster 5 | | Cluster 6 | | Cluster 7 | |
| com courtesi furnish http move turnpik volant webspac | congress email html jhoffman tm url webslingerz www | antitrust comparison directori econom nec polici research site topic web | comparabas copyright dot inc new product sect standard use welcom | action bill cfr experiment fiscal hous law librari regul search unit | affirm budget code feder homepag internet legisl link relat server use |

Fig. 4

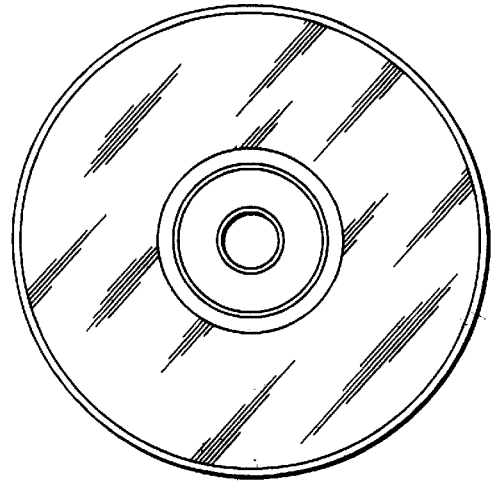

Fig. 7

| Cluster 1 | Cluster 2 | Cluster 3 | | | | | |
|---|---|---|---|---|---|---|---|
| employe  fmla  leav | action  affirm  american  peopl | act  america  believ  civil  countri  disabl  employ  feder  help  law  meet  opportun  program  reduc  set  treat | administr  applaus  busi  class  court  discrimin  equal  futur  hispan  learn  middl  own  qualifi  requir  simpl  white | african  applic  chanc  colleg  dai  divers  evid  gender  histori  live  million  percent  question  revers  standard  women | agenc  asid  chang  common  decision  don  exampl  fair  goal  individu  issu  loan  minor  person  quota  review  stronger  world | ago  base  child  commun  depart  econom  fair  govern  issu  male  move  poor  race  right  system  wrong | am  black  children  compani  develop  educ  famili  happen  job  mean  nation  presid  re  school  time |

Fig. 5

| Cluster 1 | | | Cluster 2 | | | Cluster 3 | | |
|---|---|---|---|---|---|---|---|---|
| action  code  equal  inform  legisl  relat  senat  track | affirm  congress  homepag  internet  link  repress  th  use | bill  employ  hous  lawa  rd  search  thoma | accesss  assist  connect  establish  help  instantli  onlin  preview  reserv  right  sign  valuabl | advantag  ccg  welcom  fmla  hr  leav  password  proven  resourc  select  straight  welcom | answer  complet  employe  headquart  hrhq  look  pleas  provid  return  servic  tap  worldwid | appear  cfr  content  directli  dol  ergoweb  feder  job  manag  oasam  paragraph  propos  pwba  safeti  tabl  usdol | appendic  civil  contract  director  draft  exposur  health  keyword  medic  osha  pbgc  protect  regul  section  titl  vet | appendix  sompens  control  docum  ergonom  factor  index  labor  mine  page  pertain  public  risk  standard  train  workplac |

Fig. 6

METHOD AND PRODUCT FOR DETERMINING SALIENT FEATURES FOR USE IN INFORMATION SEARCHING

RELATED APPLICATION

This application claims the benefit of U.S. Provisional Application No. 60/036,452, filed Jan. 27, 1997.

TECHNICAL FIELD

This invention relates to a method and product for determining salient features for use in information searching.

BACKGROUND OF THE INVENTION

In information searching and retrieval, particularly on the internet, a number of techniques are is known that "discover" features in sets of pre-categorized documents, such that similar documents can be found. While such techniques are capable of classifying documents with high accuracy, they are not necessarily useful in locating all types of similar documents.

For example, at the moment, most internet users are given two options for finding more documents similar to ones they already have. The first is to go to a search engine provider that has collected thousands of documents into pre-categorized topics. With this option, one simply searches the topic hierarchy for similar documents. The other option is to go to another ISP that is essentially a keyword search engine. Such engine ISPs collect millions of documents which allow users to construct keyword searches for similar documents.

However, both of these approaches have their flaws. The pre-categorized providers cannot provide a personal, idiosyncratic view of the web. Users will likely want to search document categories that are not provided. On the other hand, the word-search engines have the problem of not being able to capture the "meaning" of a set of user documents so that an appropriate query can be created.

As a result, a technique is needed for extracting word clusters from the raw document features. Such a clustering technique would be successful in discovering word groups which can be used to find similar information. In such a fashion, an internet user would be able to "personalize the web". More particularly, users would assemble a group of documents as they choose, then each group would be examined to determine what is unique about those documents, and a set of words would be provided to identify those documents. These word sets would be very useful in finding similar documents, much more so than word sets generated by users.

SUMMARY OF THE INVENTION

Accordingly, it is the principal object of the present invention to provide an improved method and product for determining salient features for use in information searching and retrieval.

According to the present invention, then, a method and product are provided for generating a word set for use in locating a document having a type similar to a type of document in a document collection. The method comprises selecting a plurality of documents from the document collection, each document selected including a plurality of words, and stemming the plurality of words in each document selected to obtain a plurality of stem words. The method further comprises determining a word count for each stem word in each document, and clustering the plurality of stem words based on the word count of each stem word in each document to obtain a word set.

The product of the present invention for generating a word set for use in locating a document having a type similar to a type of document in a document collection comprises a storage medium having programmed instructions recorded thereon. The programmed instructions are operative to select a plurality of documents from the document collection, each document selected including a plurality of words, and to stem the plurality of words in each document selected to obtain a plurality of stem words. The programmed instructions are further operative to determine a word count for each stem word in each document, and to cluster the plurality of stem words based on the word count of each stem word in each document to obtain a word set.

These and other objects, features and advantages will be readily apparent upon consideration of the following detailed description in conjunction with the accompanying drawings.

BRIEF DESCRIPTION OF THE DRAWINGS

FIG. 1 is a sample data set of categories of documents for use in the method and product of the present invention;

FIG. 2 is a sample of a partial pattern matrix according to the method and product of the present invention;

FIG. 3 is an illustration of the smallest clusters found in a document set according to the method and product of the present invention;

FIG. 4 is an illustration of the smallest clusters found in a document set based on a row normalized pattern matrix according to the method and product of the present invention;

FIG. 5 is an illustration of the smallest clusters from a particular category according to the method and product of the present invention;

FIG. 6 is an illustration of the smallest clusters from a particular category using row normalized data according to the method and product of the present invention; and FIG. 7 is a storage medium having programmed instructions recorded thereon according to the method and product of the present invention.

DESCRIPTION OF THE PREFERRED EMBODIMENT(S)

As previously noted, the explosive growth of the Internet and World Wide Web has changed the way we think about and seek information. The web provides an enormous resource for every imaginable topic, but does not provide a good means to find the information relevant to one's own interests. There are characteristics of the World Wide Web that make it extremely powerful, but also present significant challenges to users looking for particular information. First, information sources are distributed all over the world, and are not organized according to any agreed upon indexing scheme. Secondly, the information is heterogeneous and can take many different forms. Thirdly, the Web is dynamic, with the potential for both content and location to change at any time.

Thus, while the internet/web is an enormous source of information, it is often daunting to use. Users typically become familiar with only parts of this information source. That is, the "web" consists mainly of the portions of the internet users care/know about. Moreover, current web searching is based on traditional information retrieval techniques and is typically based on boolean operations of keywords. Major web search services such as Lycos, Alta Vista, WebCrawler, and Open Text employ software robots (also called spiders) which traverse the web and create an index based on the full text of the documents they find. A user submits a keyword query to one of these services, and receives the location of any document found in the index which matches the query. Different services vary in their methods of constructing the index, which is why identical queries to different search engines produce different results. Query format is also different for various services. If a user is skilled enough to formulate an appropriate query, most search engines will retrieve pages with adequate recall (the percent of the relevant pages retrieved among all possible relevant pages), but with poor precision (the ratio of relevant pages to the total number of pages retrieved).

Most users are not experts in information retrieval and cannot formulate queries which narrow the search to the context they have in mind. Furthermore, typical users are not aware of the way the search engine designers have constructed their document indexes. Indexes are constructed to be general and applicable to all; they are not tailored to an individual's preferences and needs. They necessarily include all senses of a key search term's usage, which often results in irrelevant information being presented.

It would therefore be desirable to be able to discover salient features of already established document categories as defined in a user's personal categorization. Once these features have been discovered, a software agent can use existing web search tools on behalf of an individual user to automatically seek new web documents which are potentially interesting, while filtering out much of the unnecessary information.

In that regard, the present invention provides a tool that make "cruising the web" something idiosyncratic, dependent on what users want to do or see. This tool, which is referred to herein as WORC (Web Organization by Robot Categorization), is used to find more documents that resemble documents that a user has already found, identifying what is unique about those documents so more could be found.

In general, the basis of the WORC algorithm is as follows. Each of the documents being worked with represents a dimension in a large-dimensional search space. If there are 85 documents, then an 85-dimensional space is created, one dimension per document. The "metric" along each dimension is word count. Each of the unique stem words from the entire set of documents is then placed into the search space based on its count in each of the documents. Thus, words that occur frequently in some documents end up in the same region of the search space. A k-means clustering algorithm (a standard clustering algorithm) is then applied on the words in the search space to discover clusters of words that are "close" to each other. These word clusters are close together because of the context of the documents that constitute the search space.

The unique feature of this approach is that the assignment of dimensionality in the search space as usually used in information processing is reversed. The documents, not the words, are used as the dimensions of the search space, and therefore words are clustered, not documents. The result is word clusters (not document clusters), but these words are clustered because of the context of the documents from the search space. They therefore indicate how to find similar documents.

With reference to FIGS. 1–7, the preferred embodiment of the present invention will now be described in detail. Web documents are grouped together into categories (for example, in the form of a user's bookmark file) according to an individual's preferences; there is no absolute ground truth or classification except what is defined by a particular user. Two people may have the same collection of documents, but classify them differently with both groupings equally valid. The criteria that an individual uses to classify documents are related to some underlying semantic concepts which are not directly measurable as features of the documents, however, the words that compose the documents are measurable, and we use them as the raw features of the documents. Our goal is to automatically discover some higher level features, some functions of the raw features, that represent the underlying semantic concepts which led to the user's particular classification. Clues that will help lead to discovery of the semantic concepts are in the user's classification of the bookmarked documents, so one test of feature discovery is to try to find features/words such that classification of the training documents matches the user's original categorization.

If we find a set of features that reproduce the user's classification of documents, we should be able to use those features to obtain additional documents which are similar and fit into the classification. However, this is not necessarily the case. We can find features among the raw features which reproduce the given classification with high accuracy, but are not useful in capturing semantic concepts and therefore not useful in retrieving similar documents, so focusing on classification accuracy alone is not sufficient. Techniques other than finding features which reproduce the original classification of documents may also discover features useful for document search, which are described below.

We first employ pattern recognition techniques on documents to attempt to find features for classification, then focus on clustering the raw features of the documents. Pattern recognition is a mature field in computer science with well established techniques for the assignment of unknown patterns to categories, or classes. A pattern is defined as a vector of some number of measurements, called features. Usually a pattern recognition system uses training samples from known categories to form a decision rule for an unknown pattern. The unknown pattern is assigned to one of the categories according to the decision rule. Since we are interested in the classes of documents that have been assigned by the user, we can use pattern recognition techniques to try to classify previously unseen documents into the user's categories.

While pattern recognition techniques require that the number and labels of categories are known, clustering techniques are unsupervised, requiring no external knowledge of categories. Clustering methods simply try to group similar patterns into clusters whose members are more similar to each other (according to some distance measure) than to members of other clusters.

According to the present invention, the user first collects a set of documents for inspection. For example, the present invention may use the "bookmarks" collection of a Netscape browser. Alternatively, other text collections, such as e-mail, newsgroups, etc. may be used. With respect to bookmarks specifically, the bookmarks organize documents together, and collect these organizations into a hierarchy. For example, documents may be collected under the title "Affirmative Action" and under "CAD/CAM" (although, in fact, the titles are not used by the algorithm). Each of those document collections can be evaluated individually or the entire hierarchy can be evaluated at once (the present examples evaluate all the documents at once).

Next, each of the collections from the bookmarks is used in the present invention. The "title" of each document group is ignored. The words are stemmed (words such as "high, higher, highest" are reduced to the stem word "high") and stop words ("the, and, it") are removed. The algorithm then examines all the remaining words in the documents and looks for sets of words that are similar in their usage pattern across the present set of grouped documents. Such a set from the "Affirmative Action" group might include: "affirm, act, women, minority, job, discrimin" etc. This word set may then be given to the user for use in searching for other documents.

As is readily apparent, these wordsets could also be used to automatically generate queries that the user can send to the various search engines. In that regard, the wordsets can be further refined using a process called genetic algorithms (GA), which are algorithms based on evolution that search large search spaces in reasonable time. Such algorithms can be used to find more optimal queries that can be used across the web, based on WORC's wordsets.

Referring now to FIG. 1, a sample data set of categories of documents for use in the method and product of the present invention is shown. The sample problem comes from the manufacturing domain, with web documents from the Network for Excellence in Manufacturing (NEM Online). The sample data set from NEM Online consists of 85 web documents in 4 categories.

The category labels were assigned by human experts. Note that the categories may contain underlying concepts which overlap. For example, a document discussing affirmative action may be reasonably classified into government, labor, or legal categories, according to the person who is doing the category assignment, and within the context of their other collected documents.

As those of ordinary skill in the art are aware, in prior art pattern recognition approaches, each web document is a pattern, stems of words are the features, and the number of occurrences of words in the document form the feature values. The 85 documents contain a total of 5190 distinct word stems (defined below) so there are 85 patterns in 5190 dimensional feature space. A portion of the 85×5190 pattern matrix is shown in FIG. 2.

To classify the documents using traditional pattern recognition techniques, some distance measure is used to group the pattern vectors which are "close" to each other in the feature space. The conventional rule of thumb for statistical pattern recognition techniques is that you need five to ten times as many training samples as features for each class in order to estimate the class probability distributions. For a 4 class problem and 5190 features, this means one to two hundred thousand training documents are needed. Clearly this is not possible for this domain.

A collection of 85 points in a 5190 dimensional space is extremely sparse, and an individual pattern vector will contain a value of 0 in many of the dimensions, since not all words in the global space will appear in every document. It is known that the 5190 dimensions are not uncorrelated, and not independent. In order to analyze this data, and find a function of the raw features which will be semantically useful, the dimensionality of the problem needs to be reduced somehow. Reducing the dimensionality of the problem will make classification manageable, and will also aid in finding the salient features which will be most useful for subsequent search of new documents.

In that regard, using feature selection, a "good" subset of the raw features is selected in order to reduce the dimensionality and also improve classification performance. However, improving classification performance by itself is not enough unless the features discovered can be used to retrieve additional documents that correspond to the user's categories.

For preprocessing, first a bookmark list is parsed to obtain the category assignments and the URLs of each document. The documents are retrieved and stored locally; these form a document training set. Each document is then parsed for words, defined as a contiguous string of letters, ignoring HTML tags, digits, and punctuation, as well as common English words (such as "the", "of", "and", etc.) from a pre-defined stop list. The stop list may be the one given by Fox. Each remaining word is then reduced to its word stem, so that words like computer and computing both become the same term, comput. This is a standard information retrieval technique, and the algorithm from Frakes may be used. All unique word stems from the entire training set of documents form the global feature space.

Stemming the words has the obvious advantage of reducing the feature space, resulting in 5190 distinct stemmed features vs. 7633 distinct non-stemmed features in the 85 documents. It would also seem advantageous in classification, since words with the same stems should be related to the same semantic concepts, so they should be counted as the same feature without regarding slight variations in tense and usage as distinct features. However, there are also disadvantages to word stemming. There are cases where the simple stemming algorithm reduces words to the same stem when the originals were not related. For example, "animal" and "animation" are both reduced to the same stem, "anim". There are few contexts where they refer to the same concept throughout a document collection, so counting them as the same feature may negatively impact classification results. The other disadvantage to stemming is the loss of the original term, which cannot then be used in subsequent web searching. For example, in the word "feed" the "ed" is removed to get a stem of "fe". Doing a web search on the string "fe" will produce many more documents than are relevant to "feed". Despite the potential pitfalls, stemming is used in order to reduce the initial feature space as much as possible.

The first most obvious step in attempting to classify patterns in such a high dimensional space is to simply select a "good" subset of the raw features. There are $2_n$ possible subsets of n original features, so finding the optimal subset exhaustively is computationally prohibitive, especially when n=5190. Recall that in the pattern matrix shown in FIG. 2, rows represent documents, columns represent individual features (word stems), and the feature values are the number of occurrences of that word in the given document. When trying to categorize the documents, those row vectors which are similar to each other are found and an unknown document is assigned a label according to the row that is most similar.

Referring to the pattern matrix in FIG. 2, it can be seen that rows 25 through 30, which are all from the "legal" category, are similar (and are thus close to each other in the feature space). This can be easily seen because a vastly truncated pattern matrix is shown, with rows and columns selected for illustrative purposes. The problem with classifying the row vectors comes when all 5190 features are included, which makes it much more difficult to identify similar rows.

For a pattern classifier, Euclidean distance as the distance measure between documents, and a nearest neighbor decision rule are used. When presented with an unknown pattern, the training patterns are examined, and the one which is the closest in Euclidean distance is determined. The unknown pattern is then assigned to the category of this nearest neighbor. "Leave one out" testing is used to evaluate the performance of the classifier on various feature sets.

The above classifier using all 5190 features misclassified 50 out of 85 documents, for an accuracy of 41.18%. The classification accuracy can be improved through feature selection techniques. Some effective conventional methods for feature selection are sequential forward selection, sequential floating feature selection, and genetic algorithm search.

Sequential forward selection achieved 17/85 errors, or 80% accuracy by selecting 13 features. These features were engin, action, david, contempt, affirm, architecture, ave, osha, abund, rehabilit, notic, commerce, transact. The genetic algorithm feature selection method used a fixed size subset of 25, and the best such subset achieved 21/85 errors for 75.290% accuracy. The feature set was bliznakov, volant, law, biographi, permiss, cwatx, alaska, treatment, sodium, move, evolut, version, avex, darnell, thoma, photographi, build, pany, hospit, law, lexi, plamen, briefli, export, cite. Selecting any number of features sequentially, 7/85 errors, for a 91.76% accuracy rate with only 17 features is ultimately achieved. Those features are project, job, staff, david, apr, clinton, govern, gov, sophist, affirm, favor, commission, eeo, fiscal, cfo, tm, stori. Though the subsets of features found through all three feature selection techniques achieved accurate classification of the training data, the features in each subset were quite different and do not by themselves suggest the categories of "labor", "legal", "design", and "government" in the manufacturing domain.

It is not meaningful to select a feature as a category discriminator when there are many potential candidate neighbors for a test pattern with few features. Nevertheless, the selected sets of features above achieve high accuracy rates. The answer lies in the sparse nature of the original pattern space. With 85 points in a 5190-dimensional space, there will be many piecewise linear decision boundaries which adequately partition the training patterns. However, the real question is whether these decision boundaries are meaningful or generalizable. Recall that accurate classification of the existing documents is not sufficient in the ultimate goal. Not only is some decision boundary to be found, but also the best general decision boundary, and meaningful features which will enable new documents to be found.

Efforts at classification accuracy using traditional feature selection were successful, but the resulting features were not useful in seeking new documents or in suggesting semantic concepts. Simple selection of raw features is not powerful enough to capture context or concepts. Since it is known that the features in the original pattern matrix are not uncorrelated, the 5190 features should be able to be clustered into groups whose members are similar to each other and not similar to members of other groups.

The present invention differs from and improves upon the prior art techniques just described as follows. Where prior art techniques try to assign the documents to a group according to the category of its neighbors in the word stem space, we will now try to find groups of word stems which occur in the document space. Since there are no existing categories of word stems, grouping the features is necessarily done without regard to any category labels. Now instead of looking for similarities between row vectors in the pattern matrix (FIG. 2), we look for similarities between column vectors. We can think of the word stems as the patterns, and the documents they occur in as the features. Instead of grouping 85 patterns in 5190 dimensional space, we can imagine grouping 5190 points in 85-dimensional space, which is much less sparse.

Referring to FIG. 2, we see that the columns for the features "action", "affirm", and "discrim" are similar. In this case, documents 46, 47, and 50 contained similar values for those terms. Even though the algorithm has no knowledge of document categories, there are some terms which have similar occurrences throughout the document set. This causes the column vectors to be similar (near each other in the document space) and thus the terms are put into the same group To group the features, we used Hartigan's K-means partitional clustering algorithm as implemented by S-PLUS, where K points are chosen randomly as the means of K groups in the 85 dimensional space. Each of the 5190 points is then assigned to the group whose mean is closest in Euclidean distance. After each point is assigned, the group means are recomputed, and the process repeats until either there is no change, or a fixed number of iterations has been completed. The K-means process is not guaranteed to find a global optimum grouping, so we run it several times with different random seeds in order to increase our confidence in the resulting clusters.

We chose a value of K=2(c+1), where c is the number of original document categories. With a value of K=2(4+1)=10, we assign each of the 5190 features to one of 10 groups. We ran 10 times with different random seeds, and results were consistent. One of the surprising results was that there was always a single group which contained an average of 92% of the words. These are the features which are useless for discriminating among the documents. If we discard this largest group, we are left with around 400 features to consider. The sizes of all 10 clusters for a typical run were 3, 6, 9, 9, 10, 11, 13, 104, 243, 4791. The smallest clusters are particularly interesting in that they contain word stems which to a human seem to be semantically related. The 7 smallest cluster contents in the above clustering are shown in FIG. 3.

One result that is interesting is that the two terms "affirm" and "action" nearly always appeared in the same cluster (in nine out of ten runs). If we look at the original pattern matrix (FIG. 2), we see that the term "action" appears in 22 different documents, and a total of 255 times. The term "affirm" appears in only 6 documents, a total of 137 times. However, in those 6 documents, "action" occurs almost exactly the same number of times as "affirm", which caused the clustering algorithm to consider the two column vectors similar, and group the two terms together, even though "action" by itself occurred in many other documents. We know that "affirmative action" is a two-word phrase, and it appears that the clustering algorithm successfully grouped the terms together.

Also, the term "file" appears in cluster 2. "file" by itself has many meanings, including a computer file. However, when we see the context of the remaining words in the cluster, it is apparent that this sense of "file" refers to the filing of patent applications.

Terms which are used in ordinary contexts, or unique terms which don't occur often across the training document set, will tend to cluster into the large 4000 member group. This takes care of spelling errors, proper names, which are infrequent, and terms which are used in the same manner throughout the entire document set. Terms used in specific contexts (such as file) will appear in the documents consistently with other terms appropriate to that context (patent, invent) and thus will tend to cluster together. Among the groups of words, unique contexts stand out from the crowd.

We now have a smaller set of features which can be used to construct queries for seeking out other relevant documents. If we use the conjunction of terms from a single cluster as a query to existing Web search engines, we get many documents which contain those terms, in the appropriate context. Searching the web with word clusters allows discovery of finer-grained topics (e.g., family medical leave) within the broadly defined categories (e.g. labor).

Evaluation of the results of queries from the word clusters may be done by a human, but automatic relevancy ranking of pages may be incorporated to enable the user to more effectively browse for the documents which may be of interest. Functions of cluster terms other than conjunction may also be used in constructing queries. More importantly, word clusters may also be related semantically so that we can find relevant documents that contain none of the cluster words, but have the same "meaning".

In that regard, a second algorithm may be employed that uses the results of WORC to more fully represent the "meaning" of the wordsets discovered. For example, cluster 2's wordset in FIG. 3 is {applic, claim, file, invent, patent, provision}. A human reader of that set, when asked if the phrase "intellectual property" would also be appropriate, would respond yes, even though that phrase never occurred in any of the documents. By representing the underlying meaning of that group of words, the user may be able to create a "search agent", a piece of software that in some very real sense "understands" the relevant concepts and can find them, regardless of the actual words in the documents.

One might wonder why we used number of occurrences of words in the document to form the feature values, rather than the frequency of a word (number of occurrences of a word divided by the total number of words in a given document). It is natural to think of normalizing the documents by dividing each entry of the pattern matrix by the row total, in order to normalize for document length. Under the current scheme, longer documents weigh more heavily into the clustering than shorter ones.

The K-means clustering of words was performed on the same data which had been row normalized. The semantic content was less striking than when using word occurrences. Clustering with a row-normalized pattern matrix and the same random seeds, the run reported above yielded clusters of sizes 1, 1, 9, 11, 16, 20, 22, 51, 116, 4943. The contents of the seven smallest clusters are shown in FIG. 4.

As seen therein, the two words "affirm" and "action" still show up in the same cluster, but related words which were in the same cluster using the unnormalized pattern matrix, such as "job", "women", "minority", and "discrimin", are missing. Many other terms which are probably unrelated to the topic/concept are included, such as "homepag" and "internet".

Normalization seems like a good idea, but upon reflection, we realize that it is beneficial only if the documents are fairly homogeneous in their style. We know that HTML documents vary widely, from full text to a simple list of links. We conjecture that we need some length to the documents in order to extract context which will lead to grouping of words from the same concept. Long documents are more likely to reflect "typical" usage patterns than simple lists or abbreviated documents such as abstracts. Long documents are providing more information, so it is reasonable that they contribute more heavily to the clustering. However, we would still like to ensure that the clustering is not relying on length too heavily, which it may be by using raw word counts in the pattern matrix.

We also investigated what would be the results of feature clustering if we only considered one document category at a time, rather than all categories simultaneously. This means that the dimensionality of the clustering space will be different for each category. For example, the "labor" category consists of 13 documents, which contain 1839 distinct word stems. So we are clustering the 1839 terms into K groups in 13 dimensional space. We choose K=4 using the same heuristic as with the total collection, i.e., 2(c+1) groups where c is the number of categories. Using K>4 tends to generate empty clusters. Using word counts from feature values in the "labor" category, we get clusters of size 3, 4, 95, and 1737, with the smallest three clusters shown in FIG. 5.

With frequencies used as feature values (the pattern matrix has been row normalized) in the single category case, we get larger clusters which contain the ones generated from unnormalized data. The cluster sizes for "labor" for a typical run were 23, 36, 48, and 1732. The smallest three clusters here are shown in FIG. 6.

It appears that the effect of long documents skewing the clustering is even more pronounced in the case of single category clustering. It seems that for the single category case, word counts as feature values generate overly specific clusters, and frequencies as feature values generate overly general clusters.

Clustering by single category seems to be a good idea and may help in forming clusters from terms which have multiple meanings. For example, when terms from all four classes were clustered, the term "circuit" often appears in the same cluster as "cadmaz", "software", and "electron", which seems to be consistent with the "circuit design" meaning. Clustering the terms from the "legal" category alone resulted in a cluster which included "circuit", "court" and "appeal", consistent with the legal meaning of circuit in the phrase "circuit court of appeals". Clustering from single categories provides one mechanism for allowing the term "circuit" to be in a feature cluster which is relevant to both the "design" and "legal" categories.

However, when clustering words from a single document category, we must be careful to provide enough diversity in the training data to be able to distinguish different concepts. If a category is too small or too specialized, all the important terms which would be necessary for discrimination among other categories/contexts may be used in the same manner in the smaller training set, and thus get lost in the largest cluster.

Referring finally to FIG. 7, a storage medium having programmed instructions recorded thereon according to the product of the present invention is shown. As seen therein, the storage medium is a conventional CD-ROM, although any other storage media may also be used, such as magnetic disks or magnetic tape. As those of ordinary skill in the art will appreciate, the instructions programmed on the storage medium are those necessary to perform the method of the present invention, as described in detail above.

Characteristics of the World Wide Web and the need for personal organization present challenges for traditional information retrieval and pattern recognition techniques for organizing and finding data. We have shown two important results. First, the standard approach of classifying documents can be done with high accuracy, but is not generalizable for classification of documents not in the training set, and is not useful in discovering new data. Secondly, clustering words in a document space is effective because it detects small sets of words used in a consistent non-ordinary way, and these context clusters can subsequently be used for searching for new, related information.

As is readily apparent from the foregoing description, then, the present invention provides a method and product for determining salient features for use in information searching. It is to be understood, however, that the present invention has been described in an illustrative manner and the terminology which has been used is intended to be in the nature of words of description rather than of limitation. As those of ordinary skill will appreciate, many modifications and variations of the present invention are possible in light of the above teachings. Therefore, it is also to be understood that, within the scope of the following claims, the invention may be practiced otherwise than as specifically described.

What is claimed is:

1. A computer method for generating a word set for use in locating a document having a type similar to a type of document in a document collection, the method comprising:

selecting a plurality of documents from the document collection, each document selected including a plurality of words;

stemming the plurality of words in each document selected to obtain a plurality of stem words;

determining a word count for each stem word in each document; and clustering the plurality of stem words based on the word count of each stem word in each document to obtain a word set.

2. The method of claim 1 further comprising removing stop words from the plurality of words in each document.

3. The method of claim 1 further comprising:

constructing a query from the word set;

providing the query to a search engine; and activating the search engine to locate a document having a type similar to the type of document in the document collection.

4. The method of claim 3 wherein the word set includes a plurality of words and constructing a query comprises creating a conjunction of the plurality of words in the word set.

5. The method of claim 1 wherein stemming comprises reducing each of the plurality of words in each document to a minimum string of contiguous letters.

6. The method of claim 2 wherein the stop words include "a", "and", "of", "it" and "the".

7. The method of claim 1 wherein clustering comprises performing a K-means partitioning clustering algorithm.

8. The method of claim 1 further comprising normalizing the word count of each stem word in each document selected.

9. The method of claim 1 wherein selecting a plurality of documents from the document collection includes parsing a list.

10. A product for generating a word set for use in locating a document having a type similar to a type of document in a document collection, the product comprising a storage medium having programmed instructions recorded thereon, the programmed instructions operative to select a plurality of documents from the document collection, each document selected including a plurality of words, stem the plurality of words in each document selected to obtain a plurality of stem words, determine a word count for each stem word in each document, and cluster the plurality of stem words based on the word count of each stem word in each document to obtain a word set.

11. The product of claim 10 wherein the programmed instructions are further operative to remove stop words from the plurality of words in each document.

12. The product of claim 10 wherein the programmed instructions are further operative to construct a query from the word set, provide the query to a search engine, and activate the search engine to locate a document having a type similar to the type of document in the document collection.

13. The product of claim 12 wherein the word set includes a plurality of words and, to construct a query, the programmed instructions are operative to create a conjunction of the plurality of words in the word set.

14. The product of claim 10 wherein, to stem the plurality of words in each document selected, the programmed instructions are operative to reduce each of the plurality of words in each document to a minimum string of contiguous letters.

15. The product of claim 11 wherein the stop words include "a", "and", "of", "it" and "the".

16. The product of claim 10 wherein, to cluster the plurality of stem words, the programmed instructions are operative to perform a K-means partitioning clustering algorithm.

17. The product of claim 10 wherein the programmed instructions are further operative to normalize the word count of each stem word in each document selected.

18. The product of claim 10 wherein, to select a plurality of documents from the document collection, the programmed instructions are operative to parse a list.

19. A computer method for generating a feature set for use in locating a pattern having a type similar to a type of pattern in a pattern space, the method comprising:

selecting a plurality of patterns from the pattern space, each pattern selected including a plurality of features;

minimizing the plurality of features in each pattern selected to obtain a plurality of core features;

determining a count for each core feature in each pattern; and clustering the plurality of core features based on the count of each core feature in each pattern to obtain a feature set.

20. The method of claim 19 further comprising:

constructing a query from the feature set;

providing the query to a search engine; and activating the search engine to locate a pattern having a type similar to the type of pattern in the pattern set.

21. The method of claim 20 wherein the feature set includes a plurality of features and constructing a query comprises creating a conjunction of the plurality of features in the feature set.

22. The method of claim 19 wherein clustering comprises performing a K-means partitioning clustering algorithm.

23. The method of claim 19 further comprising normalizing the count of each core feature in each pattern selected.

* * * * *